Oct. 30, 1934.  W. E. TOMLINSON  1,979,057
FOOD RECEPTACLE
Filed Nov. 22, 1933
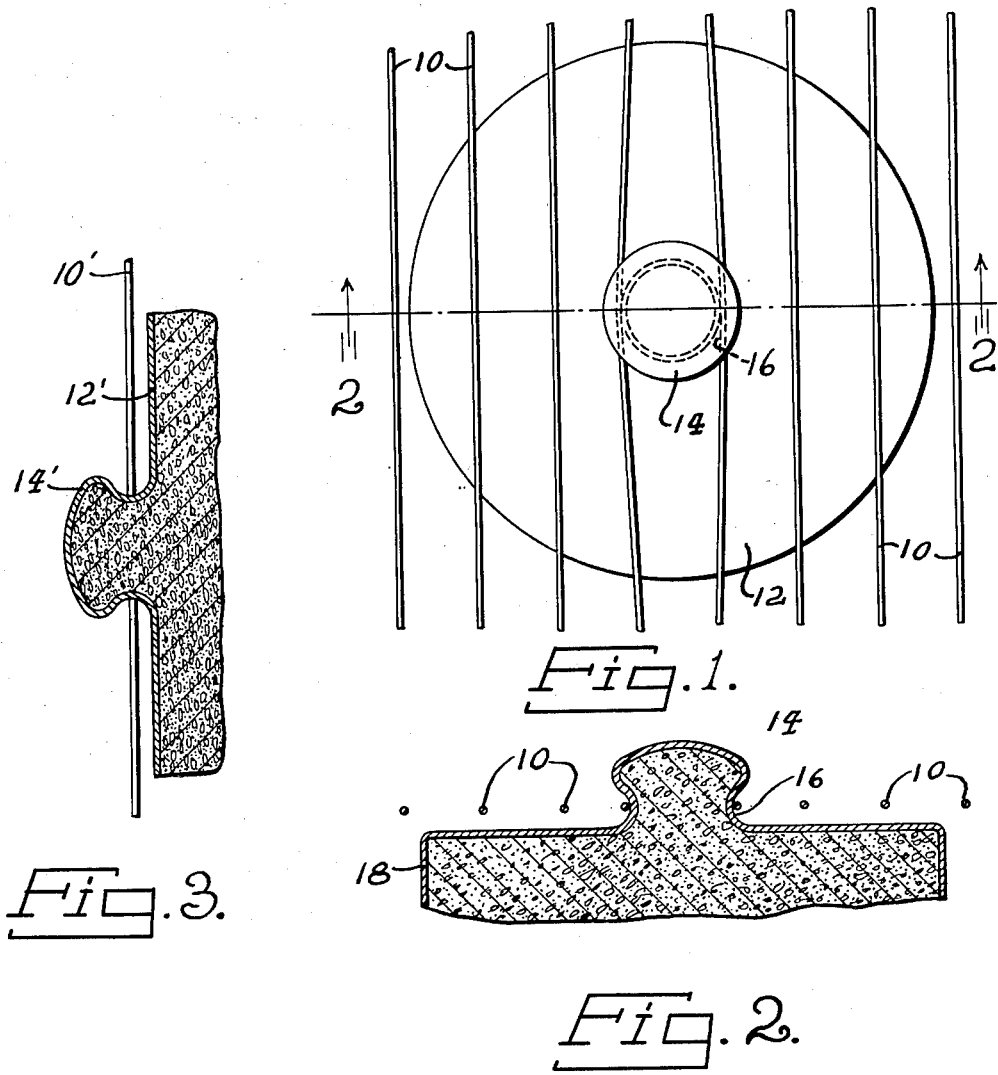
INVENTOR.
WILLIAM E. TOMLINSON.
BY
ATTORNEYS.

Patented Oct. 30, 1934

1,979,057

UNITED STATES PATENT OFFICE 1,979,057

FOOD RECEPTACLE

William E. Tomlinson, Dearborn, Mich.

Application November 22, 1933, Serial No. 699,185

8 Claims. (Cl. 119—18)

This invention relates to a food receptacle and is illustrated as embodied in a receptacle for retaining a mass of compressed food in a bird cage or the like.

An object of the invention is to provide a receptacle for a compressed food which may be supported in a cage or the like by resilient tension on the receptacle.

Another object of the invention is to provide a receptacle which retains the compressed food at its center in such a manner that practically all of the food may be consumed without interference with that portion of the food within the retaining means.

A further object of the invention is to provide a receptacle having a portion which serves as a means for retaining the receptacle on a support and also serves as a means for retaining the food within the receptacle.

Other objects and advantages of the invention will more fully appear from the following description taken in connection with the accompanying drawing in which:

Fig. 1 is a view illustrating an application of the food receptacle retained between vertical bars such as are commonly used in a bird cage.

Fig. 2 is a sectional view taken on line 2—2 of Fig. 1.

Fig. 3 is a sectional view showing a modified form of the invention, the axially extending flange being omitted.

Referring to the drawing, I have diagrammatically shown a bird cage consisting of parallel bars 10, any two of which are adapted to receive and support a novel food receptacle which consists substantially of a sheet metal stamping.

The receptacle is formed cup-shape, consisting of a radially extending flange 12 constituting a closed end or base of the receptacle. The center of the radially extending flange 12 is provided with an outwardly extending projection 14 in the form of a knob. This knob is preferably annular and has at its outer end a diameter larger than an intermediate portion between the outer end of the projection and the radially extending flange. In other words, a groove or restricted area portion 16 is formed between the outer end of the projection and the radially extending flange 12.

The receptacle is preferably made of sheet metal and the inner periphery of the projection 14 has substantially the same relative contour as the outer periphery so that the projection is hollow and forms an opening with a restricted neck portion adjacent the radially extending flange 12. In the form shown in Fig. 2, the radially extending flange 12 is provided with an axially extending flange 18 at the outer edge thereof, whereas, in the form shown in Fig. 3, the axially extending flange is omitted, the receptacle consisting only of the knob like portion 14' and the radially extending flange 12'.

The receptacle may be filled with compressed food, such as seed, with a suitable binder, which, when compressed and dry, forms a solid homogeneous mass. The portion of the compressed food within the large hollow end of the projection 14 serves as a means for retaining the entire mass within the receptacle. It is to be understood that various food compositions may be placed within the receptacle.

The outer end of the projection 14 is made considerably larger than the distance between spaced parallel bars such as are commonly used in a bird cage, and the restricted portion 16, while smaller in diameter than the outer end of the projection 14, is slightly larger in diameter than the distance between the parallel bars 10. The receptacle is placed within a bird cage, for example with the projection 14 adjacent the space between the bars. With a slight pressure the bars are spread apart sufficiently to permit the enlarged head to slide between them, whereupon the restricted neck portion 16 is received between the bars. Due to the fact that the diameter of this restricted portion is slightly larger than the space between the bars there is a frictional resistance between the bars and the restricted portion sufficient to retain the receptacle in position. The bars, having been sprung out of their normal position, are under tension thereby holding the receptacle in position.

The device is preferably made annular in shape and because it is frictionally held in its position between the bars it may be rotated so that when the food is consumed at one place the receptacle may be rotated without disturbing its location.

The device may be readily removed and replaced simply by grasping the receptacle and pulling the enlarged portion through the spaced bars. The knob like projection 14 serves a dual function, particularly when it is made of sheet metal, either stamped or spun; the restricted portion 16 serving to retain the food within the receptacle and also serving as a means for retaining the receptacle on a support.

Various changes, including the size, shape and arrangement of parts, may be made without departing from the spirit of the invention and it is not my intention to limit its scope other than by the terms of the appended claims.

What I claim is:

1. A food receptacle comprising an annular member having a closed end portion, an axially extending flange portion at the edge of said end portion and a projection adjacent the center of said end portion extending in a direction opposite to the axially extending flange and having a restricted portion between said end portion and the outer end of said projection, said projection being hollow and having its inner periphery conforming generally to the outer periphery of said projection.

2. In combination, a food receptacle comprising a cup-shaped member having a closed end portion, an outer peripheral portion and an axially extending projection at the center of said end portion, said projection being hollow and having a restricted inner periphery between the plane of the end portion and the end of said projection, and a mass of compressed food within the hollow portion of the cup-shaped member and the projection.

3. In combination, a radially extending body portion, a depressed central portion adjacent the center of said body portion having an inner periphery of varying diameters, the larger of the varying diameters being toward the end of said projection, and a mass of compressed food on one side of said body portion and within said depression.

4. In combination, a radially extending body portion, a depressed central portion adjacent the center of said body portion having an inner periphery of varying diameters, the larger of the varying diameters being toward the end of said projection, and a mass of compressed food on one side of said body portion and within said depression, the outer periphery of said projection corresponding substantially to the inner periphery thereof.

5. A device of the class described including a mass of compressed bird food, an annular body member for receiving and retaining said bird food, said body member being provided with a knob like portion and an annular groove intermediate said knob and said body, and means for engaging said annular groove for retaining said device in a fixed position.

6. A receiving and retaining device for a compressed mass comprising radially and axially extending flanges, a knob like portion formed on said radial flange, and an annular groove between said knob and said radial flange.

7. In combination a support comprising a plurality of spaced bars; a receptacle having a body portion provided with a knob like member, an annular groove in the outer periphery of said knob like member intermediate the knob member and the body portion; and a mass of compressed bird food carried by said body portion and said knob member, said knob member adapted to be received between two of the spaced bars of said support and of a diameter to spread the bars whereby they frictionally retain said body portion in position by frictional tension of the bars in the annular groove.

8. A food receptacle comprising a body portion having a hollow projection extending away from said body portion, said projection serving as a means for retaining the receptacle to a support and as a means for retaining a compressed food within said receptacle.

WILLIAM E. TOMLINSON.